3,046,312
PROCESS FOR MAKING ERYTHRITOL AND ETHYLENE GLYCOL FROM POLYMERIC DIALDEHYDES

Felix H. Otey, Carl A. Wilham, and Charles L. Mehltretter, Peoria, Ill., assignors to the United States of America as represented by the Secretary of Agriculture
No Drawing. Filed Dec. 18, 1959, Ser. No. 860,616
5 Claims. (Cl. 260—635)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to an improved process for the production of erythritol and ethylene glycol. More particularly the invention relates to a process for the production of polyhydric alcohols by the simultaneous hydrolysis and hydrogenation of a polymer composed of monomer units containing erythrose and glyoxal in hemi-acetal linkage of the following formula:

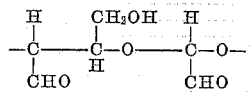

which polymer is produced by periodate oxidation of cellulose and of numerous starches which include cornstarch, wheat starch, and potato starch. The polymer has the general formula $(C_6H_8O_5)_n$ and cannot be classified as a carbohydrate to which the general formula $C_x(H_2O)_y$ is applied. For convenience this product is called dialdehyde starch to indicate both its source and its structure.

More specifically the invention concerns a practical and highly economical process for the production of erythritol and ethylene glycol wherein the polymeric dialdehyde produced by periodate oxidation of starch or cellulose is subjected to combined hydrogenation and hydrolysis, under pressure at an elevated temperature in the presence of a hydrogenation catalyst composed of nickel and a highly adsorptive inert material such as activated carbon or kieselguhr.

U.S. Patent No. 2,796,447, describes a process for hydrogenating dialdehyde starch in the presence of Raney nickel catalyst in which commercially impracticable concentrations of dialdehyde starch (about 2 percent) in water at 200° C. gave a maximum yield of erythritol of 71 percent at pH 5. In U.S. Patent No. 2,783,283, a maximum yield of erythritol of 62 percent of theory was obtained when alkali-solubilized dialdehyde starch in a more practical concentration was subjected to hydrogen under superatmospheric pressure at 180° C. and at a pH in the range of 3 to 6 in the presence of Raney nickel catalyst. This patent also teaches that water dispersions of more than 2 percent concentration of dialdehyde starch without the use of alkali solubilization are not practical since they exhibit such high viscosity or paste characteristics that contact between reactants is decreased with resulting poor yields of end products. Also charring and other undesirable side effects occur at higher concentrations.

It was thus entirely unexpected when insoluble dialdehyde starch suspension in the relatively high concentration of about 25 percent in water in the presence of about from 20 percent to 25 percent of activated carbon, based on the dry weight of the dialdehyde starch, produced yields of erythritol and ethylene glycol ranging from about 75 percent to 95 percent of theory upon hydrogenation at 150–200° C. under superatmospheric pressure using Raney nickel catalyst. Comparable yields were also obtained using a commercial nickel catalyst supported on kieselguhr consisting of 65 percent reduced nicked and 35 percent kieselguhr. Under such conditions the simultaneous hydrolysis and hydrogenation of dialdehyde starch may be conducted in a practical and economical manner substantially free of side reactions.

The process of the invention may be broadly described as a procedure for the simultaneous hydrolysis and hydrogenation of polymeric dialdehydes produced by periodate oxidation of starch or cellulose and known in the art as dialdehyde starch or dialdehyde cellulose, respectively. The dialdehyde starch is substantially water-insoluble and has a dialdehyde content of about 95 percent of theory.

The process is carried out by forming an aqueous mixture, having a pH of about from 3 to 7.5, and consisting of about 25 percent by weight, based on the weight of the mixture, of the said substantially water-insoluble dialdehyde starch having a dialdehyde content of about 95 percent of theory, about from 11 percent to 25 percent by weight, based on the weight of the dialdehyde starch, of a hydrogenation catalyst selected from the group consisting of Raney nickel and nickel supported on kieselguhr, the said nickel supported on kieselguhr catalyst consisting of 65 percent reduced nickel and 35 percent kieselguhr, and, when the catalyst is Raney nickel, about from 20 percent to 25 percent by weight, based on the weight of the dialdehyde starch, of an adsorptive material selected from the group consisting of activated carbon and kieselguhr, and then treating the thus-formed aqueous mixture with hydrogen at a temperature of about from 150° C. to 250° C. and at a pressure of about from 700 pounds to 10,000 pounds per square inch for about from 2 to 6 hours to simultaneously hydrogenate and hydrolyze the dialdehyde starch to erythritol and ethylene glycol which are recoverable in yields ranging from 75 percent to 95 percent.

It is believed that the presence of adsorptive materials, such as the activated carbon or kieselguhr serves two purposes: (1) to adsorb the polymer and/or hydrogen thus providing for a more reactive atmosphere, and (2) to adsorb and distribute the hydrogen ions thus maintaining a more uniform pH range on the catalyst surface.

The dialdehyde starch containing 6 carbon atoms per monomer unit is simultaneously hydrolyzed and hydrogenated almost quantitatively by the process of the invention to two products, a four-carbon alcohol, erythritol, and a two-carbon alcohol, ethylene glycol. Dialdehyde starch, because of its ease of formation from low-cost starch and ease with which it reacts in the process is preferred over other polymeric dialdchydes to be used in the simultaneous hydrolysis-hydrogenation reaction of the invention.

The dialdehyde starch is suspended in a concentration of about 25 percent in water after which the hydrogenation catalyst is added. Nickel is the preferred catalyst in the process of the invention but other catalysts such as copper, chromium, cobalt, and the like, might conceivably be used. The amount of hydrogenation catalyst to be used in the reaction may vary over a wide range depending on the catalyst, the additives such as carbon or kieselguhr, the polymeric dialdehyde, and the specific pH, temperature and pressures used in the process. The amount of nickel catalyst can vary from about 11% to 25 percent of the weight of the polymeric dialdehyde employed.

For the purpose of the invention it is required to add to the reaction medium any suitable inert material which conceivably adsorbs the polymeric dialdehyde, hydrogen ions, hydrogen or any one of these separately, such as activated carbon or kieselguhr but preferably nickel supported on kieselguhr. The amount of this additive may vary up to about 25 percent of the polymeric dialdehyde employed depending on the catalyst, the polymeric dialdehyde and the specific pH, temperature and pressure used in the process.

The temperature of this reaction for the purpose of the invention may be conducted in the range of 150–250° C., but it is preferred to use a temperature in the range of 180–200° C. to prevent hydrogenolysis of erythritol to lower polyols with a reduction in yield of the erythritol. The pH of the reaction mixture before hydrolysis and hydrogenation is effected, should be in the range 3–7.5 for the purpose of this invention.

The pressure of the hydrogenation used in the process of the invention may be in the range 700–10,000 pounds per sq in., but the preferred pressure range is about 1,000–2,500 pounds per sq. in.

The time of the reaction may vary with the polymeric dialdehyde but generally will be about 2 to 6 hours. Upon completion of the reaction the polyhydric alcohols may be separated from the reaction mixture by distillation and crystallization. The solvent may be removed by evaporation followed by vacuum distillation of the residue to recover ethylene glycol in the usual way. Residual erythritol may be purified by crystallization from suitable solvents or by other means. The products from dialdehyde starch are substantially erythritol and ethylene glycol essentially free from reducing substances and decomposition products.

The following examples illustrate more specifically the process of the invention.

EXAMPLE 1

Dialdehyde starch was prepared as described in U.S. Patent No. 2,713,553 and was found analytically to comprise 95 percent dialdehyde content.

Forty grams of the 95-percent periodate oxystarch (moisture, 11.3 percent) was suspended in 70 ml. of water, producing a pH of 3.3. To this suspension was added 8 grams of commercial nickel catalyst supported an kieselguhr, which increased the pH of the mixture to 7.5. The suspension was then transferred to the high pressure reaction vessel with 30 ml. of water. Hydrogen was introduced at a pressure of 2,000 p.s.i., agitation started, and the reaction mixture heated to 200° C., at which temperature it was maintained for 5.5 hours. The reactor was then cooled, vented and opened, after which the catalyst was separated by filtration. A small aliquot of the resulting colorless solution was diluted with water to a known volume and chromatographed on Whatman No. 1 filter paper with butanol-pyridine-water (6:4:3) mixture. The polyol spots were located by spraying guide strips with ammoniacal silver nitrate. Erythritol was then quantitatively eluted from the paper and the eluate made to a known volume for analysis. The reacted solution was found to contain 91 percent of the calculated quantity of erythritol.

Isolation of the products consisted of evaporating the remaining solution in vacuo to a sirup and cooling to effect crystallization of erythritol. The colorless crystals were filtered, washed with ethanol, and dried to yield 86 percent of the calculated quantity of erythritol; M.P. 114°–117° C. The slightly contaminated substance was recrystallized from ethanol to obtain a pure product; M.P. 121° C. The tetrabenzoate which was prepared from the product melted at 188° C. A mixed melting point with an authentic sample was 188° C.

Ethylene glycol was recovered in 83 percent yield by concentration of the ethanol wash in vacuo followed by distillation of the residue near 100° C. and 2 mm. pressure. Additional product was accounted for in evaporation losses during concentration and distillation to make a total ethylene glycol yield of more than 90 percent of theory. The di-p-nitrobenzoate prepared from the recovered ethylene glycol had a melting point of 143°–144° C., and did not depress the melting point of an authentic sample.

All results were calculated to percentage of the erythritol theoretically obtainable from periodate oxystarch after correction for the 5 percent unoxidized glucose residues and the 4 percent of nonreducing end groups in starch.

The procedure described is a single-stage process in which a high concentration of dialdehyde starch in water suspension is hydrogenated in the presence of a supported nickel catalyst.

Table I shows that high yields of erythritol and ethylene glycol are obtained in the reaction temperature range of 160°–200° C. using a supported nickel catalyst.

*Table I*

Yields of erythritol as effected by reaction conditions of temperature and catalyst at a dialdehyde starch concentration of 25 percent and reaction time of 5.5 hours.

| Temperature, °C. | Catalyst | Catalyst [a], Conc., percent | Erythritol yield, percent analytical | Ethylene glycol isolated |
|---|---|---|---|---|
| 180 | Raney Ni (W-4) [f] | [b] 33 | 66 | |
| 180 | ----do [f] | [b] 33 | 65 | |
| 180 | ----do [f] | [b] 33 | 63 | |
| 180 | Raney Ni (W-4) [f] + activated carbon [c]. | [b] 33 | 91 | |
| 180 | ----do [f c] | [b] 33 | 90 | |
| 180 | ----do [f c] | [b] 33 | 89 | |
| 160 | Ni-kieselguhr [g] | 22 | 91 | |
| 180 [d] | ----do [g] | 22 | 89 | |
| 180 | ----do [g] | 22 | 95 | 91 |
| 200 | ----do [g] | 22 | 91, 86 [e] | |
| 200 | ----do [g] | 11 | 76 | |
| 230 | ----do [g] | 22 | 84 | |

[a] Based on weight of dialdehyde starch.
[b] Ethanol wet.
[c] Commercial activated carbon used in a concentration of 22%, based on weight of dialdehyde starch.
[d] Reaction time 2.5 hours.
[e] Isolated yield.
[f] Raney nickel, W-4, was prepared by the action of sodium hydroxide on Raney nickel-aluminum alloy as described by Pavlic and Adkins, J. Am. Chem. Soc. 68, 1471 (1946).
[g] Ni-kieselguhr was a commercial product consisting of 65% reduced nickel and 35% kieselguhr.

EXAMPLE 2

The procedure in Example 1 was repeated except the reaction temperature was maintained at 180° C. Yield of erythritol by analysis was 95 percent of theory.

EXAMPLE 3

Forty g. of dialdehyde starch (moisture, 11.3 percent) was suspended in 70 ml. of water (resulting in a pH of 3.2). Then 12 g. of ethanol-wet Raney nickel was added, raising the pH to 5.1. To this suspension was then added 8 g. of activated carbon, after which the mixture had a pH of 6.3. The mixture was then transferred to the reaction vessel with 30 ml. of water and subjected to the same conditions for hydrolysis and hydrogenation as in Example 2. The final reaction solution, when filtered and diluted to 500 ml., had a pH 4.9. The yield of erythritol by analysis was 91 percent of theory.

As shown in the table in Example 1, Raney nickel alone is not a suitable catalyst; however, when used in conjunction with activated carbon the quantity of erythritol produced is comparable to that found with a commercial nickel catalyst supported on kieselguhr. The exact function of these supporting agents is not known, but is believed to be the maintenance of a more uniform pH range in the reaction mixture at elevated temperatures.

Having disclosed our invention, we claim:

1. A process for producing erythritol and ethylene glycol in 75% to 95% yields from substantially water-insoluble dialdehyde starch having a dialdehyde content of about 95% of theory, comprising forming an aqueous mixture, having a pH of about from 3 to 7.5, and consisting of about 25% by weight, based on the weight of the mixture, of said dialdehyde starch, about from 11% to 25% by weight, based on the weight of the dialdehyde starch, of a hydrogenation catalyst selected from the group consisting of Raney nickel and nickel supported on kieselguhr, the said nickel supported on kieselguhr catalyst consisting of 65% reduced nickel and 35% kieselguhr, and, when the catalyst is Raney nickel, about from 20% to 25% by weight, based on the weight of the dialdehyde starch, of an adsorptive material selected from the group consisting of activated carbon and kieselguhr, and treating the thus-formed aqueous mixture with hydrogen at a temperature of about from 150° C. to 250° C. and at a pressure of about from 700 pounds to 10,000 pounds per square inch for about from 2 to 6 hours to simultaneously hydrogenate and hydrolyze the dialdehyde starch to erythritol and ethylene glycol.

2. The process of claim 1 wherein the adsorptive material is activated carbon.

3. The process of claim 1 wherein the adsorptive material is kieselguhr.

4. The process of claim 1 wherein the erythritol and ethylene glycol are separately recovered.

5. The process of claim 1 wherein the hydrogenation catalyst is Raney nickel and the adsorptive material is activated carbon.

References Cited in the file of this patent

UNITED STATES PATENTS

| | | |
|---|---|---|
| 2,609,398 | Lolkema et al. | Sept. 2, 1952 |
| 2,609,399 | Kool et al. | Sept. 2, 1952 |
| 2,783,283 | Sloan et al. | Feb. 26, 1957 |
| 2,796,447 | Sloan et al. | June 18, 1957 |